United States Patent
Grant

(10) Patent No.: US 7,156,625 B2
(45) Date of Patent: Jan. 2, 2007

(54) FUEL PUMP WITH FILTER-ABSENT SAFETY VALVE AND UNIVERSAL INLET AND OUTLET

(76) Inventor: Barry S. Grant, Route 1, Box 1900, Dahlonega, GA (US) 30533

( * ) Notice: Subject to any disclaimer, the term of this patent is extended or adjusted under 35 U.S.C. 154(b) by 590 days.

(21) Appl. No.: 10/696,938

(22) Filed: Oct. 30, 2003

(65) Prior Publication Data

US 2004/0146413 A1   Jul. 29, 2004

Related U.S. Application Data

(60) Provisional application No. 60/422,809, filed on Oct. 31, 2002.

(51) Int. Cl.
*F04B 39/16* (2006.01)
*F04B 7/00* (2006.01)
*F04B 17/03* (2006.01)

(52) U.S. Cl. .................................... 417/313; 417/446
(58) Field of Classification Search ................ 137/549; 251/149.6; 417/410.4, 313, 441, 446, 454
See application file for complete search history.

(56) References Cited

U.S. PATENT DOCUMENTS

| | | | | |
|---|---|---|---|---|
| 5,248,223 A | * | 9/1993 | Hill | 415/55.3 |
| 5,622,623 A | * | 4/1997 | Stone | 210/232 |
| 6,082,984 A | * | 7/2000 | Matsumoto et al. | 418/171 |
| 6,179,577 B1 | * | 1/2001 | Meyer | 417/313 |
| 6,190,139 B1 | * | 2/2001 | Isozumi et al. | 417/313 |
| 6,793,463 B1 | * | 9/2004 | Ward | 417/199.1 |

* cited by examiner

*Primary Examiner*—Anthony Stashick
*Assistant Examiner*—Jessica Frantz
(74) *Attorney, Agent, or Firm*—Thomas, Kayden, Horstemeyer & Risley, LLP

(57) ABSTRACT

Fuel pump 10 includes a filter 42 that rests on ledge 48, between the pump housing 12 and inlet cap 56. Filter detector 50 has a valve engager stem 62 for opening the check valve 58 and bearing feet 52 that engage the perimeter of the filter but the bearing feet are out of alignment with the ledge. When the filter is absent from the pump, the bearing feet 52 of the valve engager move beyond the ledge 48 and the valve engager stem 62 retracts from the check valve 58 and the valve closes to terminate flow of fuel to the pump, thus limiting the fuel that can escape from then pump when it is opened. At least one of the inlet and outlet caps 56 and 76 are rotatably mounted to the intermediate body of the pump to allow the fuel inlet and outlet to be oriented at angular intervals about the pump to facilitate the connection of fuel lines to the pump.

15 Claims, 4 Drawing Sheets

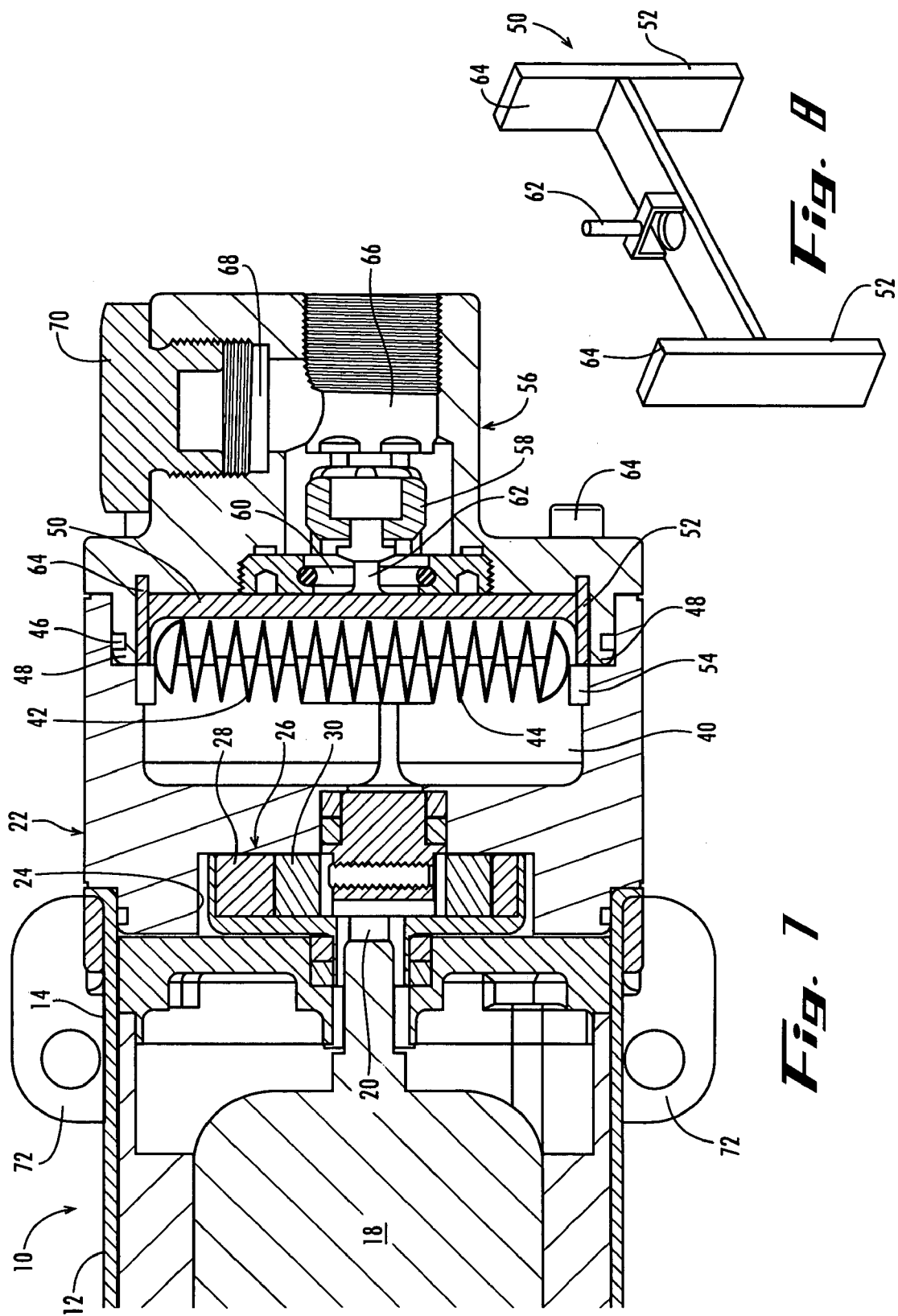

_US 7,156,625 B2_

FUEL PUMP WITH FILTER-ABSENT SAFETY VALVE AND UNIVERSAL INLET AND OUTLET

CROSS REFERENCE

Applicant claims the benefit of Provisional Application No. 60/422,809, filed on Oct. 31, 2002.

FIELD OF THE INVENTION

This invention concerns a fuel pump for an automobile, for feeding gasoline from the storage tank of the vehicle to the internal combustion engine. More particularly, the invention concerns a cut-off valve for terminating the flow of fuel from the storage tank when the fuel pump is opened, as when the filter is being inspected or replaced. Also, the invention concerns a fuel pump housing that has end caps that can be rotated with respect to the housing to facilitate axial or radial connection of the fuel lines to the pump.

BACKGROUND OF THE INVENTION

High performance cars of the type used for drag racing, track racing, etc. require that the parts used be versatile and reliable. Typically, cars are frequently worked on by their owners so as to obtain the highest possible performance of the vehicles. In some instances, when the parts are interchanged, the new combination of parts will not necessarily fit together in a compatible relationship in the small areas about the vehicle. Therefore, it is desirable that the parts have some adjustments built into their designs so that the mounts, inlets and outlets and other features can be reoriented to face away from adjacent parts.

In addition, when the fuel pump of an engine is to be temporarily disconnected for replacement or inspection of the internal filter, the typical prior art fuel pump and fuel line are filled with fuel and the fuel tends to pour out of the fuel line through the fuel pump until the fuel line is empty or the fuel pump is reassembled. This is a hazardous situation and is inconvenient for the worker to collect the runoff fuel.

Also, when the fuel pump has been disconnected and its filter removed, it is possible to inadvertently reconnect the fuel pump to the fuel line without having the filter replaced in the pump.

This invention is directed to the above noted features.

SUMMARY OF THE INVENTION

Briefly described, the present invention concerns a fuel pump for an internal combustion engine that has end caps that are universal, in that they can be rotated on the body of the fuel pump so as to reorient the angle at which the fuel lines connect to the ends of the fuel pump.

In addition, the embodiment of the fuel pump includes a check valve positioned at the inlet end of the pump housing, and a filter detector is positioned between the check valve and the filter. The filter detector includes a valve engager for extending toward the check valve and engaging and urging the check valve toward its open position against the pressure of the fuel coming from the tank, and a filter engager for engaging the fuel filter. In response to the filter being present between the pump and the check valve, the filter detector engages and opens the check valve, allowing fuel to flow through the fuel pump.

The arrangement is such that once the fuel pump housing is opened for the purpose of removing or inspecting the fuel filter, the filter detector moves away from the check valve, allowing the check valve to close. This stops the leakage of fuel from the fuel line. Once the filter has been replaced or inspected, and the fuel pump housing is to be closed up, the parts are moved together and tightened, causing the filter detector to reengage the check valve and open it, allowing access of the fuel to the fuel pump, so that the fuel pump can function normally.

The fuel pump utilizes a small pump, such as a ring gear pump that includes inner and outer axially offset rotor rings with the inner ring having radially outwardly extending lobes received in the radially outwardly extending lobe recesses of the outer ring, so that the rotation imparted to one of the rings the other ring also rotates. Since there are fewer lobes on the inner ring than there are lobe recesses on the outer ring, the rotation of the inner and outer rings causes a suction on one side of the assembly and a pressure on the other side of the assembly, inducing a positive displacement of the fuel moving through the pump. This creates a stream of fuel that flows axially through the inlet end, the check valve, the filter, about the motor, and through the outlet end, to be delivered to the fuel injectors or carburetor that meters the fuel to the cylinders of the engine. Other types of pumps can be used for this invention, if desired.

Thus, it is an object of this invention to provide an improved fuel pump for an internal combustion engine, which includes a safety valve for closing the flow of fuel through the pump when the pump housing is opened.

Another object of this invention is to provide an improved fuel pump that includes a filter-absent safety valve and a universal fuel line connection on at least one of its ends to facilitate the connection of fuel lines at convenient angles to the fuel pump.

Another object of this invention is to provide a lightweight; compact fuel pump for an internal combustion engine, whereby access to and use of the fuel pump is improved.

Other objects, features and advantages of this invention will become apparent upon reading the following specification when taken in conjunction with the accompanying drawings.

BRIEF DESCRIPTION OF THE DRAWINGS

FIG. 3 is a side view of the fuel pump.

FIG. 7 is an enlarged view of the inlet end of the fuel pump assembly.

FIG. 8 is a perspective view of the filter dector.

DETAILED DESCRIPTION

Figure 1:
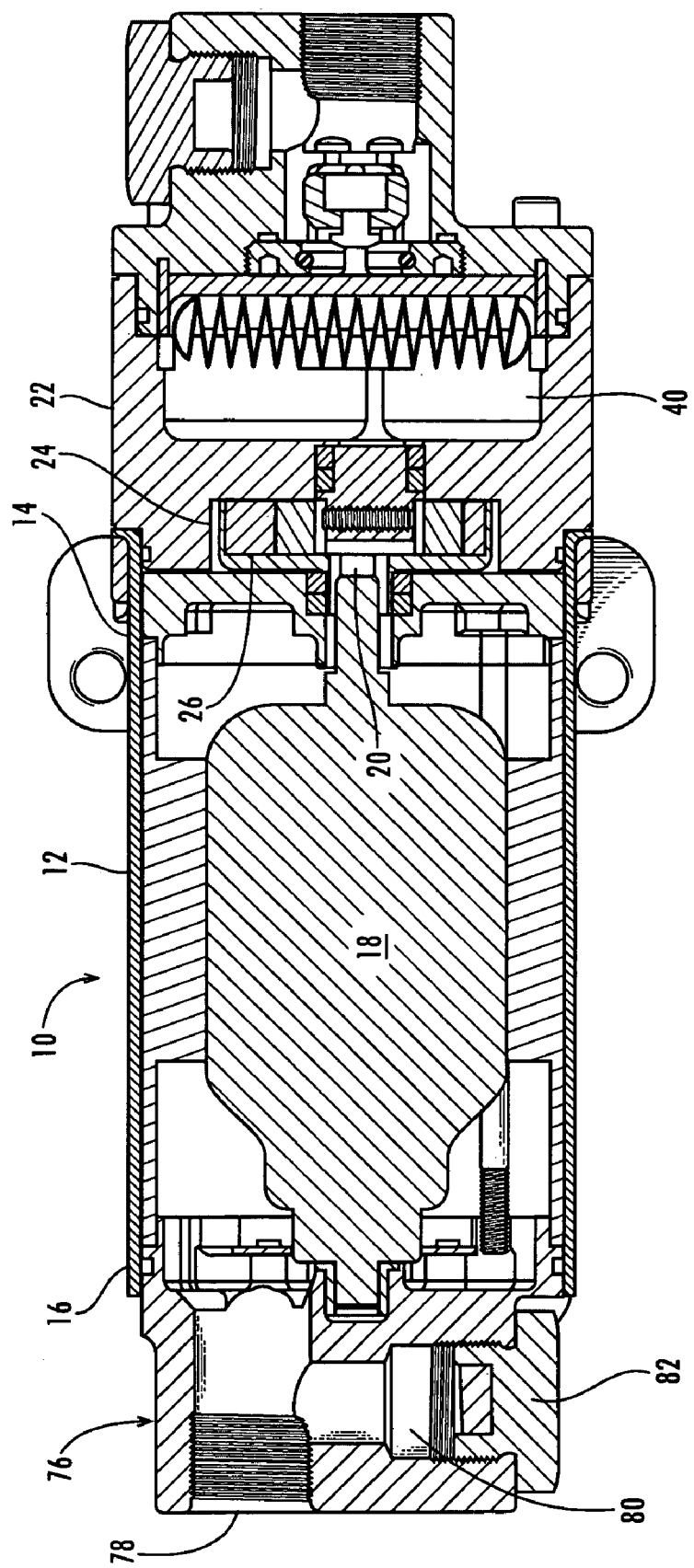
FIG. 1 is a top view, in cross section, of the fuel pump assembly.
Figure 2:
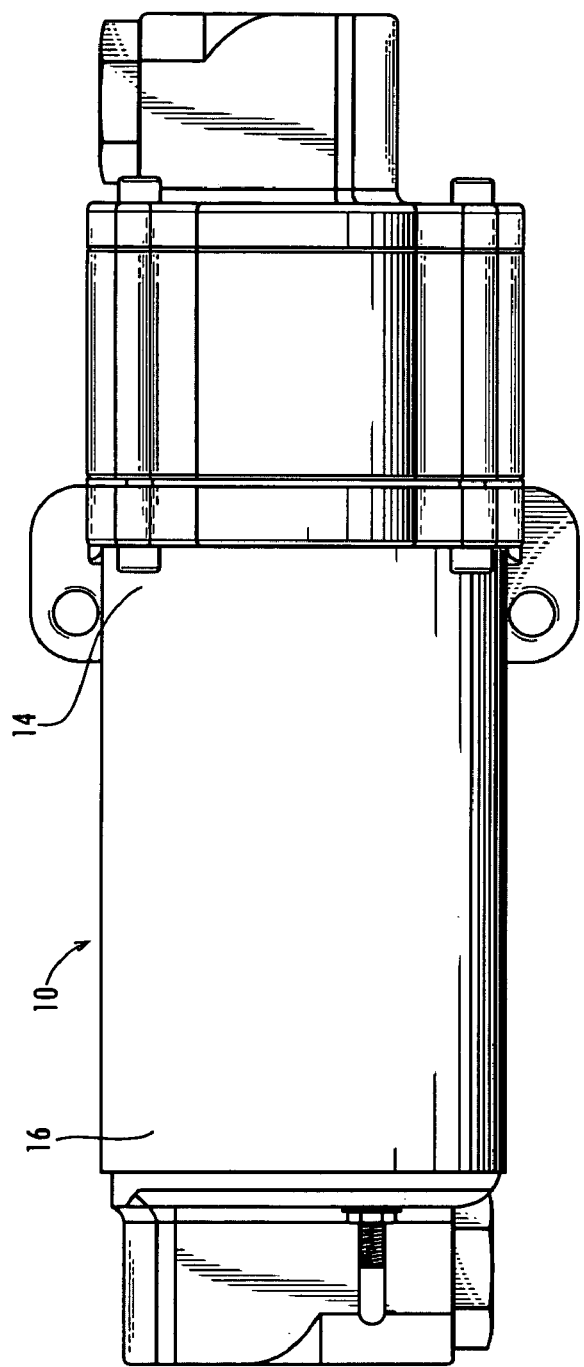
FIG. 2 is a top view of the fuel pump.
Figure 1:
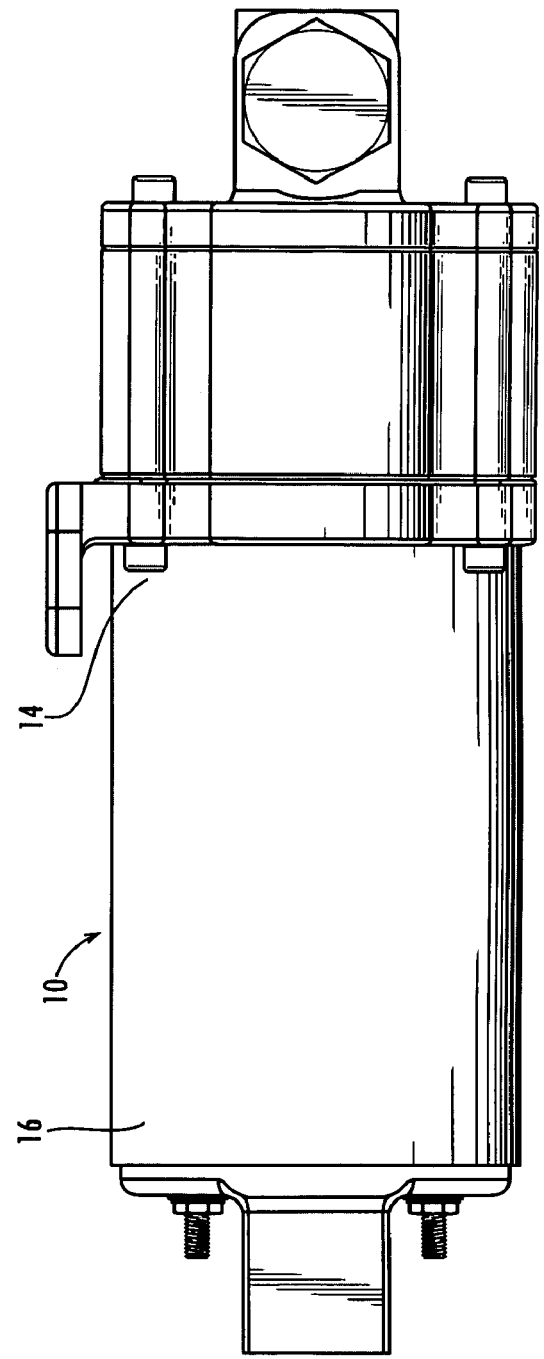

Referring now in more detail to the drawings in which like numerals indicate like parts throughout the several views, FIG. 1 illustrates a top cross sectional view of the fuel pump assembly 10 which includes a tubular motor housing 12 having an inlet end 14 and an outlet end 16. Motor 18 is positioned in the housing, with its drive shaft 20 extending toward the inlet end 14. Pump housing 22 is mounted at the inlet end 14 of the motor housing 12. Pump housing includes pump cavity 24, with the pump cavity being aligned with motor 18. Ring gear pump 26 is mounted in pump cavity 24.

Figure 6:
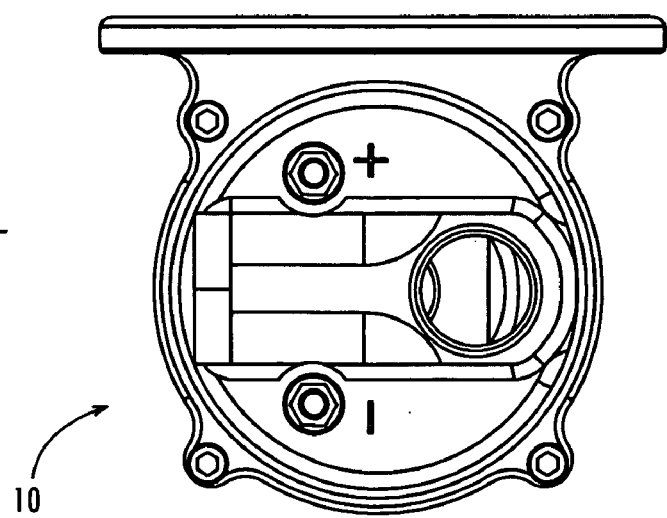
FIG. 6 illustrates the ring gear pump, showing the inner and outer rotor rings that rotate and induce the stream of fuel through the fuel pump assembly.

As shown in FIG. 6, ring gear pump 26 includes an outer drive ring 28 and an inner driven ring 30. The outer drive ring 28 is rotated by motor 18 and the outer drive ring engages and drives the inner driven ring 30.

The outer drive ring includes a plurality of inwardly facing lobe recesses 32 at equally circumferentially spaced intervals about the outer ring. The inner ring 30 includes a plurality of outwardly facing lobes 34 also at equally circumferentially spaced intervals about the inner ring that project outwardly into the lobe recesses 32. There are more lobe recesses 32 than there are lobes 34, the lobes are smaller than the lobe recesses and the inner ring has its axis of rotation off set from the axis of rotation of the outer ring. This arrangement leaves some of the space in the lobe recesses 32 unoccupied as the inner and outer rings rotate together. An inlet port 36 is formed on an end plate adjacent the inner and outer rings, and an outlet port 38 is formed on the other side of the inner ring, on the opposite end plate. With this arrangement, rotation of the rings induces a low pressure on one side of the inner ring and a high pressure on the other side of the inner ring, creating a stream of fuel from the inlet end 14 through the outlet end 16 of the tubular motor housing 12.

A filter cavity 40 is formed upstream of the ring gear pump 26. A disk shaped filter 42 is positioned in the filter cavity 40. Filter 42 includes a layer of porous material 44 at the center of the disk shape, and a rigid perimeter frame 46 that surrounds the porous filter material 44.

The filter cavity 40 includes an annular ledge 48 that is concentric with the housing 12, and the rigid perimeter filter frame 46 is sized and shaped to fit against the annular ledge 48. This orients the layer of porous filter material 44 transverse to the stream of fuel that is to move through the motor housing 12.

Filter detector 50 is mounted in the pump housing 12. Filter detector 50 includes a filter engager in the form of bearing feet 52 that extend to a lateral breadth that is slightly less than the outer breadth of the rigid perimeter filter frame 46, and is aligned with recess 54 on the opposite side of the filter frame 46. The bearing feet 52 can be moved into the recess 54 when the filter 42 is absent from the pump, as when the filter has been removed for replacement or inspection. However, when there is a filter 42 present in the position illustrated in the drawings, bearing feet 52 cannot move beyond the rigid perimeter filter frame 46, and must stay in the position illustrated.

Inlet end cap 56 is mounted to pump housing 22. End cap 56 includes a check valve 58 that is movable axially of the pump assembly, from the position illustrated in FIG. 7 to a position where it bears against a valve seat 60.

Filter detector 50 also includes at its end opposite to the filter engager a valve engager 62. The valve engager is aligned with check valve 58. Valve engager is in the form of a stem that is movable with filter detector 50 and functions to engage and open the valve 58 with respect to its valve seat 60 when a filter 42 is positioned as shown in FIG. 7. However, when the filter 42 is absent from the fuel pump assembly, the filter detector 50 is free to move its bearing feet 52 into the recess 54, whereupon the valve engager stem 62 no longer holds the valve 58 off of its valve seat 60. This allows the pressure of the fuel in the line to push the valve 58 toward a closed relationship with respect to its valve seat 60, thereby terminating the flow of fuel to the fuel pump.

The filter detector 50 also includes alignment pegs 64 that extent opposite to feet 52 that register with alignment recesses 65 of inlet end cap 56. The alignment pegs slidably register with the alignment recesses to hold the bearing feet in alignment with the perimeter flange of the filter.

With this arrangement, when the fuel pump is opened for inspection or replacement of the filter 42, the flow of fuel to the fuel pump will be terminated. Also, when a filter is replaced in the filter cavity 40 in the manner as illustrated in FIG. 7, with its rigid perimeter filter frame 46 properly seated against the annular ledge 48, the re-assembly of the pump, by mounting the inlet end cap 56 to the pump housing 22, will cause the filter detector 50 to again open the valve 58, by moving the valve away from its valve seat 60.

Figure 4:
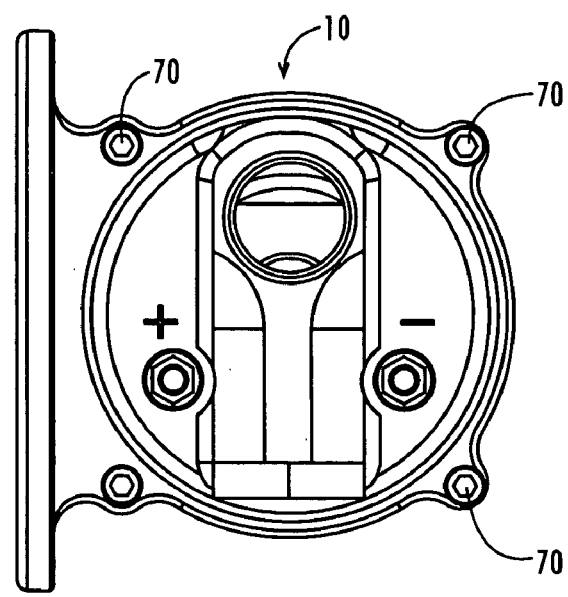
FIG. 4 is an end view of the fuel pump, taken from the left end of FIG. 3.
Figure 5:
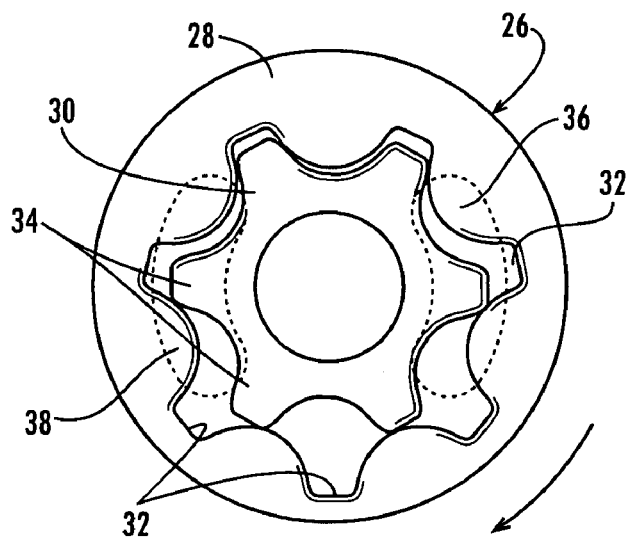
FIG. 5 is an end view of the fuel pump, taken from the right end of FIG. 3.

Inlet end cap 56 includes an axial fuel inlet opening 66 and a radial fuel inlet opening 68. A fuel conduit (not shown) can be connected to one of the inlet openings and a plug 70 can be used to block the other opening 66 or 68. The inlet end cap 56 is fastened to the pump housing 22 by screws such as screws 70 of FIG. 4. The screws 70 and their threaded bores are located in a square array so that the inlet end cap 56 can be oriented at any one of the 90° positions with respect to the pump assembly. With this arrangement, the radial fuel inlet opening 68 can be oriented upwardly as illustrated in FIG. 7, to the rear or to the front, or downwardly. This allows the pump to be mounted in a predetermined position by means of bolting its support legs 72 to an associated mounting structure, and the inlet end cap 56 can be oriented so as to direct the radial fuel inlet opening in any one of the four positions available. This permits the fuel line to be connected at any one of the 90° positions. In the alternative, the fuel line can be connected to the axial opening 66, if desired.

Likewise, outlet end cap 76 (FIG. 1) is mounted in a similar manner, with the connector screws and their openings arranged in a square array, so that the outlet end cap can be rotated at 90° intervals with respect to the tubular motor housing 12. Also, the outlet end cap 76 includes axial fuel outlet opening 78 and radial fuel outlet opening 80, with a plug 82 that can be used to block either one of the openings. With this arrangement, the outlet end cap 76 can be oriented at any one of the 90° positions so as to connect the fuel line (not shown) to the radial fuel outlet opening 80. Or, the fuel conduit can be connected to the axial fuel outlet opening 78, if desired.

In this embodiment of the invention no spring has been disclosed for urging the check valve 58 toward its valve seat 60, since the pressure of the oncoming fuel is expected to move the valve toward engagement with its valve seat. However, a spring can be used to facilitate this valve closing movement, if desired.

It will be noted that the configuration of the filter detector 50 is such that it engages only the rigid perimeter filter frame 46, not the layer of porous filter material 44, therefore avoiding damage of the filter material. In addition, the bearing feet 52 engage the rigid perimeter filter frame 46 closely adjacent the annular ledge 48, so that there is virtually no likelihood of damage to the rigid perimeter filter frame upon assembly of the fuel pump, as by the operator attempting to force a misfit of the inlet end cap 56 against the pump housing 22.

The pump 26 is disclosed as a ring gear pump; however, pumps of other types can be used in the environment of the fuel pump assembly, such as sliding vane pumps, roller vane pumps, and other compact rotary pumps.

Although a preferred embodiment of the invention has been disclosed in detail herein, it will be obvious to those skilled in the art that variations and modifications of the disclosed embodiment can be made without departing from the spirit and scope of the invention as set forth in the following claims.

I claim:

1. A fuel pump for a combustion engine of a self propelled vehicle, comprising:
    a tubular motor housing having opposed inlet and outlet ends,
    a motor in said housing,
    a pump at said inlet end of said housing, said pump in driven relationship with said motor for moving fuel in a stream from the inlet end of said motor housing, through said motor housing and out of said outlet end of said motor housing,
    a filter at said inlet end of said motor housing up stream of said pump configured for filtering fuel moving in the stream toward said pump, said filter having a rigid perimeter,
    a check valve at said inlet end of said motor housing up stream of said filter for reducing the stream of fuel moving through said motor housing to said filter, and
    a filter detector positioned between said check valve and said filter, said filter detector including a valve engager for extending toward said check valve and urging said check valve toward its open position and a filter engager for engaging said perimeter of said filter,
    whereby in response to a filter being present between said pump and said check valve, said filter detector opens said check valve.

2. The fuel pump of claim 1, wherein said pump is a ring gear pump.

3. A fuel pump for a combustion engine of a self propelled vehicle, comprising:
    a housing having a fuel inlet and a fuel outlet,
    a pump in said housing for moving fuel in a stream from the fuel inlet and out of said outlet,
    a filter at said inlet of said housing up stream of said pump configured for filtering fuel moving in the stream toward said pump,
    a check valve at said inlet of said housing up stream of said filter for terminating the stream of fuel moving through said housing to said filter, and
    a filter detector positioned between said check valve and said filter, said filter detector including a valve engager for extending toward said check valve and urging said check valve toward its open position and a filter engager for engaging said filter,
    whereby in response to a filter being present between said pump and said check valve the filter engager of the filter detector engages the filter and the valve engager of the filter detector engages and opens the check valve, and in response to a filter not being present between the pump and the check valve the filter engager of the filter detector does not engage the filter and the valve engager of the filter detector does not engage and open the check valve.

4. The fuel pump of claim 3, wherein said filter includes a perimeter, and said filter engager of said filter detector is configured to engage said perimeter.

5. The fuel pump of claim 4, wherein said filter detector is configured to engage said perimeter of said filter at more than one position about said perimeter.

6. The fuel pump of claim 5, wherein said housing defines recesses, and said filter detector includes bearing feet aligned with and movable into said recesses, and said filter positioned in said housing to block the movement of said bearing feet into said recesses.

7. The fuel pump of claim 6, wherein said housing defines guide recesses, and said filter detector includes guide pegs movable into said guide recesses for guiding said filter detector toward said check valve.

8. The fuel pump of claim 3, wherein said filter detector is H-shaped with a fuel passage formed in the cross bar of the H-shape.

9. The fuel pump of claim 3, wherein said filter detector is H-shaped, and said valve engager of said filter detector includes a valve stem carried by the cross bar of said H-shape.

10. The fuel pump of claim 3, wherein said housing includes an elongated intermediate housing having opposed ends, an inlet end cap mounted to one end of said housing and an outlet end cap mounted to the other end of said housing, said fuel inlet extending radially through said inlet end cap, and said inlet end cap and said intermediate housing being configured for mounting said inlet end cap at intervals of rotation about said intermediate housing for orienting said inlet at selected positions about said housing.

11. The fuel pump of claim 3, wherein said housing includes an elongated intermediate housing having opposed ends, an inlet end cap mounted to one end of said housing and an outlet end cap mounted to the other end of said housing, said fuel outlet extending radially through said outlet end cap, and said outlet end cap and said intermediate housing being configured for mounting said outlet end cap at intervals of rotation about said intermediate housing for orienting said fuel outlet at selected positions about said housing.

12. The fuel pump of claim 3, and further including a motor in said housing for operating said pump.

13. A fuel pump for a combustion engine of a self propelled vehicle, comprising:
    a housing,
    a fuel pump in said housing,
    an inlet end cap mounted to said housing,
    a fuel inlet extending through said inlet end cap,
    an inlet check valve in said inlet end cap for terminating flow of fuel into said housing,
    a ledge formed on said housing facing said inlet end cap,
    a filter positioned between said housing and said inlet end cap and having a perimeter engaging said ledge, with said inlet cap configured to urge said filter perimeter against said ledge,
    a filter detector positioned in said inlet end cap and including a filter engager in alignment with said perimeter of said filter for engaging said filter perimeter and a valve engager in alignment with said inlet check valve for engaging said inlet check valve and opening the flow of fuel through said fuel inlet cap,
    whereby in response to a filter being present between the housing and the inlet end cap the filter engager of the filter detector engages the filter and the valve engager of the filter detector engages and opens the inlet check valve, and in response to the filter not being present between the housing and the inlet end cap the filter engager of the filter detector does not engage the filter and moves away from the inlet check valve and the filter detector does not open the inlet check valve.

14. The fuel pump of claim 13, wherein
    said inlet end cap and said housing are configured for mounting said inlet end cap at intervals of rotation about said housing.

15. A fuel pump for a combustion engine of a self propelled vehicle, comprising:
- a housing,
- a fuel pump in said housing,
- an inlet end cap mounted to said housing,
- a fuel inlet extending through said inlet end cap,
- an inlet check valve in said inlet end cap for terminating flow of fuel into said housing,
- a ledge formed on said housing facing said inlet end cap,
- a filter positioned between said housing and said inlet end cap and having a perimeter engaging said ledge, with said inlet cap configured to urge said filter perimeter against said ledge,
- a filter detector positioned in said inlet end cap and including a filter engager out of alignment with said ledge and in alignment with said perimeter of said filter for engaging said filter perimeter and a valve engager in alignment with said inlet check valve for engaging said inlet check valve and opening the flow of fuel through said fuel inlet cap,
- whereby in response to a filter being present between housing and said inlet end cap the filter engager of the filter detector engages the filter and the valve engager of the filter detector engages and opens the inlet check valve, and in response to the filter not being present between the housing and the inlet end cap the filter engager of the filter detector does not engage the filter and moves beyond the ledge of the housing and the valve engager of the filter detector does not open the inlet check valve.

* * * * *